United States Patent Office 3,198,789
Patented Aug. 3, 1965

3,198,789
CERTAIN 3-AMINO-5-PHENYL-1,3-DIHYDRO-2H-1,4-BENZODIAZEPIN-2-ONE COMPOUNDS
Stanley C. Bell, Philadelphia, Pa., assignor to American Home Products Corporation, New York, N.Y., a corporation of Delaware
No Drawing. Filed Jan. 20, 1964, Ser. No. 338,581
5 Claims. (Cl. 260—239.3)

This application is a continuation-in-part of my previous application, Serial Number 187,983, filed April 16, 1962.

This invention relates to compositions of matter classified in the art of chemistry as substituted benzodiazepines.

The invention sought to be patented resides in the concept of a composition of matter being a chemical compound having a molecular structure in which there is attached, to the 3-position of the 5-phenyl-1,3-dihydro 2H-1,4-benzodiazephin-2-one nucelus the monovalent basic amino or $NH_2$ group.

The tangible embodiments of the composition aspect of the invention possess the inherent general physical properties of being relatively high melting, white crystalline solids; are substantially insoluble in water and are soluble in polar solvents, such as lower aliphatic alcohols. Examination of the compounds produced according to the hereinafter described process reveals, upon ultraviolet and infrared spectrographic analysis, spectral data confirming the molecular structure hereinbefore set forth. Thus the frequency of the exocyclic amino group in the 3-position is evident. The aforementioned physical characteristics, taken together with the nature of the starting materials and the mode of synthesis, positively confirm the structure of the compositions sought to be patented.

The tangible embodiments of the invention possess the inherent applied use characteristics of exerting qualitatively varying psycholeptic effects, as evidenced by pharmacological evaluation according to standard procedures. Thus, tangible embodiments show muscle relaxant, anticonvulsant and sedative effects.

The manner and process of making the invention will now be generally described so as to enable a person skilled in the art of chemistry to make the same as follows:

PREPARATION OF STARTING MATERIALS

The starting materials, such as 3,7-dichloro-1,3-dihydro-5-phenyl-2H-1,4-benzodiazepin-2-one (I), for example, for making the compounds of the present invention, can be prepared by treating with thionyl chloride or hydrochloric acid 7-chloro-3-hydroxy-5-phenyl-1,3-dihydro-2H-1,4-benzodiazepin-2-one (II), obtainable by the alkaline hydrolysis of 3-acyloxy-7-chloro-5-phenyl-1,3-dihydro-2H-1,4-benzodiazepin-2-one (III), which may itself be prepared by the action of acetic anhydride on 7-chloro-5-phenyl-1,3-dihydro-2H-1,4-benzodiazepin-2-one 4 - oxide (IV). This series of reactions is illustrated as follows:

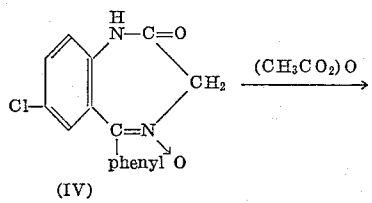

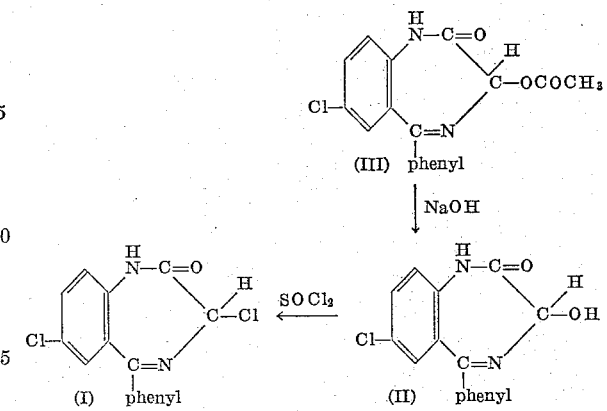

PREPARATION OF FINAL PRODUCTS

The physical embodiments of our concept are made by reacting an above-described 3-chloro starting material with ammonia, or a primary or secondary amine. The chlorine atom at the 3-position in compounds of Formula I is very reactive and accordingly these compounds react at room temperature, or below, with ammonia and primary and secondary amines having the amino moiety it is desired to have in the 3-position of the composition of the invention, to yield the compounds sought to be patented. The reaction takes place within about an hour and is preferably conducted in a suitable neutral and inert solvent such as diethyl ether, dioxane, ethylene glycol dimethyl ether, or mixtures of these, with or without water. It will be realized by those skilled in the art of organic chemistry that in the place of 3-chloro-2H-1,4-benzodiazepin-2-ones (I) there can be used as starting materials the analogous 3-bromo and 3-iodo-2H-1,4-benzodiazepin-2-ones.

The best mode contemplated by the inventor of carrying out his invention will now be set forth as follows:

Example I

3 - amino-7-chloro-5-phenyl-1,3-dihydro-2H-1,4-benzodiazepin-2-one.

A. *Preparation of starting material.*—Reflux a mixture of 5.0 g. of 7-chloro-3-hydroxy-5-phenyl-1,3-dihydro-2H-1,4-benzodiazepin-2-one and 50 ml. of thionyl chloride for 30 minutes. Evaporate under reduced pressure unreacted thionyl chloride. Add ether to the residue, and collect the 3,7 - dichloro - 1,3 - dihydro-5-phenyl-2H-1,4-benzodiazepin-2-one.

B. *Preparation of final product.*—Dissolve 3,7-dichloro-5-phenyl-1,3-dihydro-2H-1,4-benzodiazepin-2-one in ethylene glycol dimethyl ether, and filter to remove any small amount of undissolved material. Add the solution to an excess of ammonia dissolved in ethylene glycol dimethyl ether and stir at room temperature for about 20 minutes. Filter the mixture and concentrate the filtrate by vacuum evaporation. Dissolve the residue in cold acetonitrile and treat with an excess of alcoholic hydrogen chloride to cause precipitation of the hydrochloride salt. Recrystallize from alcohol to yield the hydrochloride semi-alcoholate of 3-amino-7-chloro-5-phenyl-1,3-dihydro-2H-1,4-benzodiazepin-2-one, melting at 225–226° C.

Dissolve the hydrochloride salt in water and treat with sodium carbonate solution to precipitate the free base. Recrystallize from alcohol to yield 3-amino-7-chloro-5- phenyl-1,3-dihydro-2H-1,4-benzodiazepin-2-one melting at 205–206° C.

The above-prepared compound was tested and found to exhibit results qualitatively indicating its effectiveness for the uses hereinbefore asserted. The compound can be formulated for use in the manner known to those skilled in the art of formulating pharmaceuticals, by admixing with various carriers, excipients and diluents.

It will be apparent from the disclosure herein to those skilled in the art of organic chemistry that, in the starting materials used in making the final products of the invention, certain of the carbon atoms in the benzenoid portion of the nucleus and the nitrogen atom in the 1-position of the 5-phenyl-1,4-benzodiazepin-2-one nucleus can be substituted with groups non-reactive with ammonia or a primary or secondary amine. Therefore, in conducting the process for producing the compositions constituting the invention, all 5-monocyclic aryl-1,3-dihydro-3-chloro-2H-1,4-benzodiazepin-2-ones having such non-interferring groups can be employed as starting materials in the process of making aspect of this invention. The benzo portion of the benzodiazepine nucleus can have one or more substituents other than hydrogen, as for example, lower alkyl, halo such as chloro or bromo, nitro, trifluoromethyl, or methylsulfonyl at the 6-, 7-, 8-, or 9-positions. In the 1-position there can be an alkyl group such as methyl, ethyl or propyl, an alkenyl group such as propargyl, allyl, or methylallyl, or a lower aralkyl group such as benzyl or phenethyl. The monocyclic aryl in the 5-position can be the 2-thienyl, 3-thienyl, or 2-, 3-, or 4-pyridyl. The aryl nucleus can bear one or more simple substituents such as lower alkyl, chlorine or bromine, trifluoromethyl, or methylsulfonyl.

Specifically, but without limiting the generality of the foregoing, 7-bromo-3-chloro-5-(p-chlorophenyl)-1,3-dihydro-2H-1,4-benzodiazepin-2-one, 3,7-dichloro-1-methyl-5-phenyl-1,3-dihydro-2H-1,4-benzodiazepin-2-one, 3,7-dichloro-5-(2-thienyl) - 1,3-dihydro-2H-1,4-benzodiazepin-2-one are the full equivalents of the 3,7-dichloro-1,3-dihydro-5-phenyl-2H-1,4-benzodiazepin-2-one above, as starting materials. Such materials are either known compounds or can be prepared in a manner similar to that above described for 3,7-dichloro-1,3-dihydro-5-phenyl-2H-1,4-benzodiazepin-2-one.

Compounds of the type illustrated by Formula IV, above, and from which the aforesaid starting materials can be made, include, by way of example but without limitation, 7-chloro-1,3-dihydro-5-phenyl-2H-1,4-benzodiazepin-2-one 4-oxide (M.P. 238–9°); 1,3-dihydro-5-phenyl-2H-1,4-benzodiazepin-2-one 4-oxide (M.P. 250°) 1,3-dihydro-7-methyl-5-phenyl-2H-1,4-benzodiazepin-2-one 4-oxide (M.P. 235–236°); 7-chloro-1,3-dihydro-5-(2-thienyl)-2H-1,4-benzodiazepin-2-one 4-oxide (M.P. 255–256°); 7-bromo - 5-(p-chlorophenyl) - 1,3-dihydro-2H-1,4-benzodiazepin-2-one 4-oxide (M.P. 260–261° dec.); 7-chloro-1,3 - dihydro-1-methyl-5-phenyl-2H-1,4 - benzodiazepin-2-one 4-oxide (M.P. 178–180); 7-chloro-5-(o-chlorophenyl)-1,3-dihydro - 1-methyl-2H - 1,4-benzodiazepin-2-one 4-oxide (M.P. 218–220°); 7-chloro-5-(o-chlorophenyl)-1,3-dihydro-2H-1,4-benzodiazepin-2-one 4-oxide; 5-phenyl-7-chloro-1 - (2-dimethyl aminoethyl) - 1,3-dihydro - 2H-1,4-benzodiazepin-2-one 4-oxide (M.P. 211–212°); 7-chloro-1-ethyl-1,3-dihydro-5-phenyl - 2H-1,4-benzodiazepin-2-one 4-oxide (M.P. 211–212°).

Modifications of the amino group in the 3-position of tangible embodiments of the molecular structure of the invention are illustrated by 7-chloro-3-methylamino-5-phenyl-1,3 - dihydro - 2H-1,4-benzodiazepin-2-one (M.P. 227–230°), 7-chloro-3-(β-dimethyl-aminoethylamino)-5-phenyl-1,3-dihydro-2H - 1,4-benzodiazepin - 2-one (M.P. 182–183°); 7-chloro - 3-morpholino - 5-phenyl-1,3-dihydro-2H-1,4-benzodiazepin-2-one (M.P. 211–213°), 3-benzylamino-7-chloro - 5-(2-thienyl)-1,3-dihydro - 2H-1,4-benzodiazepin-2-one; 3-anilino-7-bromo - 5-(o-chlorophenyl) - 1,3-dihydro-2H-1,4-benzodiazepin-2-one; 7-chloro-3-diethylamino-1-methyl-5-phenyl - 1,3-dihydro-2H-1,4-benzodiazepin-2-one; 7-chloro-5-phenyl-3pyrrolidino-1,3-dihydro-2H-1,4 - benzodiazepin-2-one; 7-chloro-5-phenyl-3-[4-methyl piperazino]-1,3-dihydro-2H-1,4-benzodiazepin-2-one; and 7 - chloro - 5 - phenyl - 3 - piperidino - 1,3 - dihydro - 2H-1,4-benzodiazepin-2-one.

The novel compounds are basic in character and can form acid addition salts. Nontoxic pharmacologically useful salts of these compounds may be prepared by methods well known in the art with such inorganic and organic acids as hydrochloric, sulfuric, phosphoric, maleic, succinic, fumaric and citric acids.

Substituents present in the starting materials on the benzo portion of the nucleus or on the 1- and 5-positions will appear in the final products in the same respective position. We have made several final products from such starting materials, tested the same, and ascertained the presence of such substituents does not adversely affect the use characteristics of the 5-phenyl-1,3-dihydro-2H-1,4-benzodiazepin-2-one nucleus having an exocyclic amino group in the 3-position. Variations in the nature of the 3-amino group were also prepared and tested to ascertain that the precise nature of the basic amino substituent produced only relatively small qualitative differences in pharmacological effects.

The subject matter which the applicant regards as his invention is particularly pointed out and distinctly claimed as follows:

1. The composition of matter having a molecular structure in which there is attached, to the 3-position of the 5-phenyl-1,3-dihydro-2H-1,4-benzodiazepin-2-one nucleus, the monovalent basic $NH_2$ group.

2. 3-amino-7-chloro-5-phenyl-1,3-dihydro-2H-1,4-benzodiazepin-2-one.

3. 7-chloro-3-methylamino-5-phenyl-1,3-dihydro-2H-1,4-benzodiazepin-2-one.

4. 7 - chloro-3-(β-dimethylaminoethylamino)-5-phenyl-1,3-dihydro-2H-1,4-benzodiazepin-2-one.

5. 7-chloro-3-morpholino-5-phenyl-1,3-dihydro-2H-1,4-benzodiazepin-2-one.

No references cited.

NICHOLAS S. RIZZO, *Primary Examiner.*